(12) United States Patent
Han et al.

(10) Patent No.: US 11,054,800 B1
(45) Date of Patent: Jul. 6, 2021

(54) INTELLIGENT AUTOMATIC BUILDING CONTROL SYSTEM WITH INTEGRATED BAS AND FMS, AND FACILITY MANAGEMENT METHOD BY SAME INTELLIGENT AUTOMATIC BUILDING CONTROL SYSTEM

(71) Applicant: SAMWON C&G CO., LTD., Wonju-si (KR)

(72) Inventors: Gurn Go Han, Goyang-si (KR); Jin Hee Jang, Seoul (KR)

(73) Assignee: SAMWON C&G CO., LTD., Wonju-si (KR)

( * ) Notice: Subject to any disclaimer, the term of this patent is extended or adjusted under 35 U.S.C. 154(b) by 0 days.

(21) Appl. No.: 17/207,159

(22) Filed: Mar. 19, 2021

(30) Foreign Application Priority Data

Jun. 16, 2020 (KR) .................. 10-2020-0072857

(51) Int. Cl.
    *G05B 19/042* (2006.01)
(52) U.S. Cl.
    CPC .. *G05B 19/042* (2013.01); *G05B 2219/25011* (2013.01)
(58) Field of Classification Search
    USPC .......................................................... 700/28
    See application file for complete search history.

(56) References Cited

U.S. PATENT DOCUMENTS

| 2012/0232701 | A1* | 9/2012 | Carty | ................. | G05B 15/02 |
| | | | | | 700/277 |
| 2017/0089625 | A1* | 3/2017 | Wallace | .................. | F25B 31/00 |

FOREIGN PATENT DOCUMENTS

| JP | 2001357112 | | 12/2001 |
| JP | 2001357112 | A * | 12/2001 |
| KR | 20130049254 | | 5/2013 |
| KR | 20130049254 | A * | 5/2013 |
| KR | 101801631 | | 11/2017 |
| KR | 101914770 | | 11/2018 |
| KR | 102114895 | | 5/2020 |

\* cited by examiner

*Primary Examiner* — Mohammad Ali
*Assistant Examiner* — Joshua T Sanders
(74) *Attorney, Agent, or Firm* — Cantor Colburn LLP

(57) ABSTRACT

Provided is an intelligent automatic building control system in which a BAS and an FMS are integrated, and a facility management method by the intelligent automatic building control system. In particular, the automatic building control system integrates: a BAS unit that monitors an environmental condition at a predetermined location in a building, and controls and monitors an operation of a specific facility that supplies cooling/heating to the location in order to improve the environmental condition; and an FMS unit that maintains information input in relation to the facility, checks a fuel consumption of the facility, and monitors a real-time price of fuel supplied to the facility.

9 Claims, 4 Drawing Sheets

INTELLIGENT AUTOMATIC BUILDING CONTROL SYSTEM WITH INTEGRATED BAS AND FMS, AND FACILITY MANAGEMENT METHOD BY SAME INTELLIGENT AUTOMATIC BUILDING CONTROL SYSTEM

BACKGROUND OF THE INVENTION

1. Field of the Invention

The present disclosure relates to an intelligent automatic building control system and an intelligent automatic building control method and, more particularly, to an intelligent automatic building control system with a built-in facility management function in which a BAS and an FMS are integrated, and a facility management method by the intelligent automatic building control system in which the BAS and the FMS are integrated.

2. Description of the Prior Art

In order to control cooling or heating in buildings, a building automation system (BAS) is installed and operated. The BAS collects indoor and outdoor environment information (e.g., temperature, humidity, ventilation conditions, illuminance, etc.) of a building, compares the information with a configured value of an operation standard, generates a control signal for operating a corresponding facility (e.g., an air conditioner, a heating device, a boiler, a ventilation fans/duct, hot water facility, a lighting device, etc.), and outputs the control signal to the facility. Accordingly, the condition of the indoor environment including the temperature and humidity in the building may be automatically adjusted.

In order to manage various facilities in the building, a facility management system (FMS) is separately installed and operated. The FMS receives building information, facility information, maintenance management information, and energy management information, and predicts and manages the condition of facilities on the basis of the input information.

In particular, for an existing FMS, when a human manager manually inputs information, such as general facility and building information, facility history management information, and failure repair information, the information is merely stored and maintained in the system, and therefore it is configured that the human manager determines the condition of a facility at the discretion of the human manager by directly checking the stored information, and the human manager re-inputs information related to the facility from time to time. The existing FMS is a separate system in a place separate from the BAS, and is installed and operated individually/independently, so that direct information exchanging between the BAS and the FMS cannot be done.

However, the BAS and the FMS need to share information with each other in terms of controlling and managing the facility of the building, and when an integrated system to share related information is established, it is possible to reduce the cost of implementing each system individually, reduce management workforce, and provide more improved functions than functions which can be provided separately by each of the BAS and FMS.

As such, a prior art related to integration of heterogeneous systems related to an automatic building control may include U.S. Pat. No. 10,180,1631 (title: Building facilities energy management control system and control method thereof) (hereinafter, referred to as "prior art").

The above prior art provides a building facility energy management control system including a plurality of DDC devices including: a DDC unit configured to receive building environment data and operation state data of a facility from a sensor, generate and output a control signal for controlling an operation of the facility on the basis of a preconfigured operation condition and the received building environment data and operation state data of the facility, and receive and output again the building environment data and the operation state data of the facility according to the output control signal; and a BEMS (i.e. Building Energy Management System) unit configured to store building environment data and operation state data of a facility, which are output from the DDC unit, analyze the stored building environment data and operation state data of the facility so as to generate energy analysis data, and transmit the generated energy analysis data to the DDC unit.

A building facility energy management control system of a site-oriented facility direct management control type is implemented, in which the DDC device is equipped with a BEMS function to perform a building facility control and energy management.

However, a building facility energy management control system according to the prior art merely controls an operation of a facility by using energy analysis data generated based on building environmental data and operation state data of the facility That is, it is just addition of one factor that controls the facility.

That is, even if the BEMS function is integrated into the DDC, a new function is not provided by the integration thereof, and the system according to the prior art is still limited to performing a unique function that each of individual systems fundamentally performs.

SUMMARY OF THE INVENTION

The present disclosure is to solve a problem of an existing technology, which corresponds to limitation of using only a basic function that each system can solely provide, wherein the problem has occurred due to the requirement of separate installation of a system implementing a BAS and a system implementing an FMS, which has caused a difficulty in operation of separately managing each system, and a failure of sharing information on each system.

That is, an aspect of the present disclosure is to build a system in which a BAS and an FMS are integrated, to enable information to be shared/exchanged between the BAS and the FMS and, furthermore, to provide a new function that each system is unable to solely implement via integrated information.

In order to achieve the aspect, a dual-structured processor is applied, in which one part performs a functions as a processor of a BAS, and the other part performs a function as a processor of an FMS, thereby integrating the BAS and the FMS into a single system. In this integrated system, information for the BAS and information for the FMS may be seamlessly shared/exchanged so as to enable analysis of real-time operation efficiency of each facility or analysis of a trend of operation efficiency, so that an optimal operation control may be performed for a desired facility, and an optimal replacement time for a specific facility may be further predicted and determined based on the operation efficiency.

The integrated system provided by the present disclosure enables reduction of an installation cost and a management cost compared to individual implementation of a BAS and an FMS, enables efficient operation of facilities, and enables selection and operation of the facilities in an optimal manner, thereby reducing facility operation costs.

According to an intelligent automatic building control system, in which a BAS and an FMS are integrated, and a facility management method by the intelligent automatic building control system, which are based on an embodiment of the present disclosure configured by the above elements, information for a BAS and information for an FMS can be seamlessly shared and exchanged by integrating the BAS and the FMS into a single system, so that it is possible to analyze a change trend and real-time information of operation efficiency of each facility, so as to perform an optimal operation control by selecting a facility with optimal efficiency from among a plurality of facilities, and it is also possible to predict and detemine an optimal replacement point for a particular facility, so as to reduce an overall operation cost of a building to a minimum.

That is, according to the intelligent automatic building control system provided by the present disclosure: both a BAS function and an FMS function can be implemented by a single system, and an installation cost and a management cost of the system can be thus reduced compared to separate implementation of the BAS and the FMS; a labor cost can be reduced by automated processing; a high-efficiency facility can be selected and operated in an optimal way, and efficient operation of facilities is thus possible so as to reduce a fuel cost; and a facility operation cost can be reduced by allowing a low-efficiency facility or a facility with an increasing operation cost to be replaced at an optimal time.

BRIEF DESCRIPTION OF THE DRAWINGS

The above and other aspects, features, and advantages of the present disclosure will be more apparent from the following detailed description taken in conjunction with the accompanying drawings, in which.

DETAILED DESCRIPTION OF THE EXEMPLARY EMBODIMENTS

Figure 1:
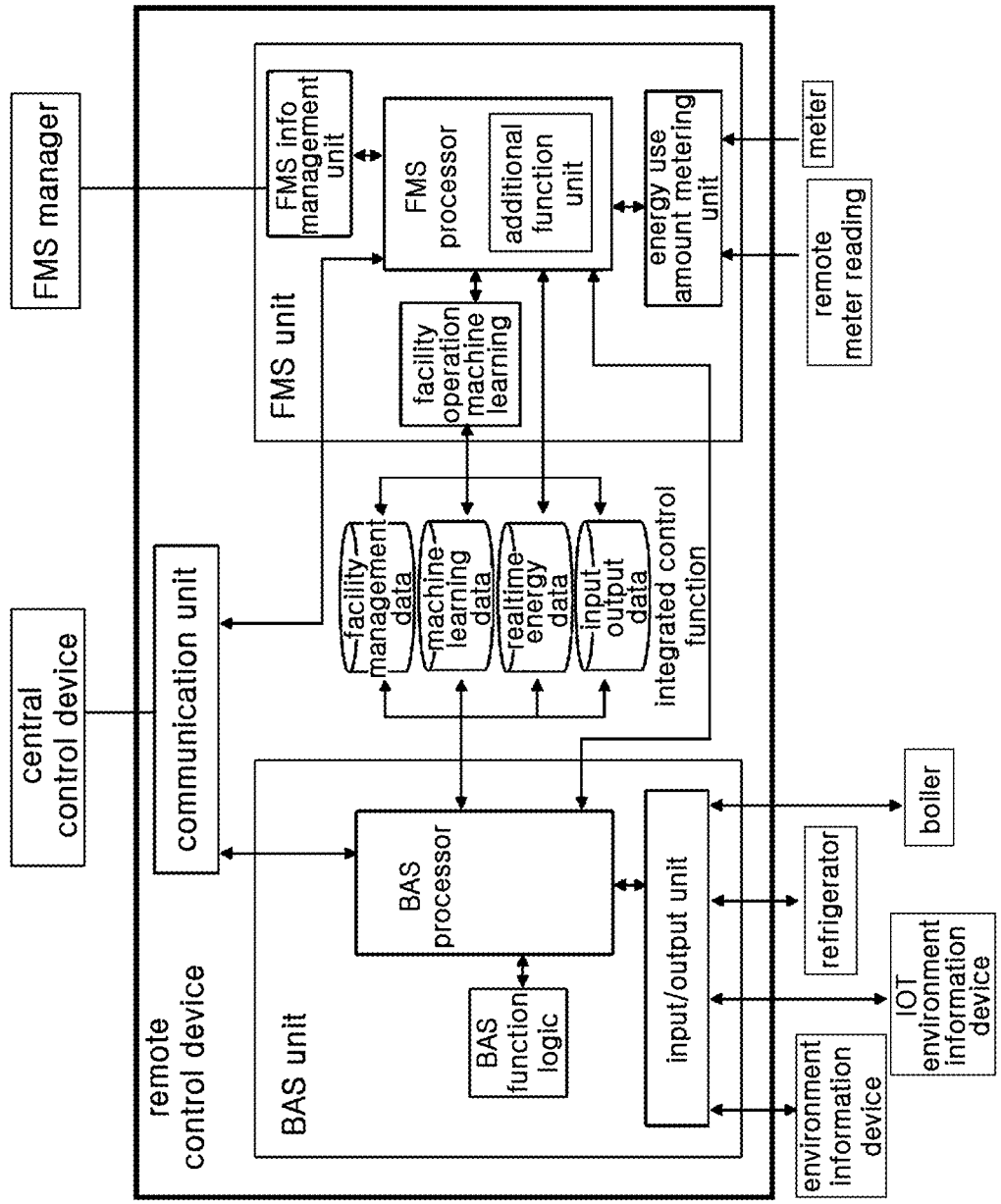
FIG. 1 schematically illustrates a configuration of an intelligent automatic building control system in which a BAS and an FMS are integrated, according to an embodiment of the present disclosure.

In the present disclosure, a BAS refers to a system which is implemented so that a manager of facilities in a building may conveniently monitor and automatically control, in a central monitoring room (disaster prevention center or machine room), the facilities (controlled devices) for heating and cooling, ventilation, sanitation (hot water), lighting, power supply, etc., thereby allowing occupants in the building to have no inconvenience in their lives. The BAS may include, for example, a BAS function implementation unit, an environment information sensor (temperature, humidity, pressure, CO2, CO, etc.), and a controller (control valve, damper controller, etc.).

The BAS may receive digital input information, such as alarm information, alert, and state (operating or stopping) information of the facilities (controlled devices) for heating and cooling, ventilation, sanitation (hot water), lighting, power supply, etc. in the building. Environment information (temperature, humidity, pressure, $CO_2$, CO, flow rate, etc.) for determination of whether the facilities (controlled devices) for cooling and heating, ventilation, sanitation (hot water), lighting power supply, etc. in the building are operating, and an appropriate operation intensity (1st, 2nd, 3rd, etc.) may be received as an analog input signal.

Based on the above input information, the BAS monitors heating and cooling ventilation, sanitation (hot water), lighting, and power supply states (indoor temperature, humidity, ventilation state, light on/off, etc. for each space (floor, room, etc.) in the building and automatically controls facilities (controlled devices) for heating and cooling, ventilation, sanitation (hot water), lighting, and power supply, which are in charge of a corresponding space, so that occupants in each space do not have any inconvenience in their lives.

Accordingly, the BAS automatically operates the facilities (controlled devices) for optimal indoor environment creation, cooling and heating, ventilation, sanitation (hot water), lighting, etc. in the building according to preconfigured values of a facility manager, and adopts automation for tasks to be done by multiple people, so as to reduce a labor cost for facility management, and the BAS reduces (encouraging use of energy only as much energy as necessary) energy consumption by preventing excessive heating and cooling, hot water supply, and lighting operations by adopting automation, and enables a cooling effect to be achieved at a low cost by comparing indoor enthalpy with outdoor air enthalpy and injecting outdoor air into a room during a change of seasons.

In the present disclosure, an FMS is a management system which establishes a reasonable facility management system for facilities in a building, reduces building operation costs via standardized business operation, increases effect of facility management, and maximizes value of facility assets. The FMS may include, for example, an FMS function implementation unit, a remote meter reading unit, and a meter (gas, power, oil, hot water, etc.).

The FMS may receive and manage energy-specific measurement information (measurement information may be received from the BAS or may be measured directly), meter reading information (meter reading information may be received from the BAS or measurement may be directly performed via remote meter reading or a meter) of energy consumption, facility information according to use, facility information by location, a specification table for each facility, facility maintenance information, information relating to preventive maintenance plans/complaint reception from occupants, work related information, material item request information, material order information, material shipment information, building-related drawings and data information, building information, floor information, room information, establishment of integrated DB for information on facilities, establishment of facility operation process, facility budget information, building management-related company state/contract/evaluation information, and the like.

The FMS may perform, on the basis of the input information, building energy management (energy-specific measurement state, inquiry for meter reading state, energy efficiency, etc.), building facilities (facilities for heating and cooling, ventilation, sanitation (hot water), lighting power supply, etc.) management, facility information according to use, facility information by location, a specification table for each facility, facility maintenance management, management (complaint reception management, preventive maintenance management, work registration management, work schedule management, etc.) of work in the building, material management for building management (material item request management, material order management, material shipment management, material inventory management, etc.), building-related drawings and data management, building management (building information, floor information, room information, etc.), building operation management (establishment of an integrated DB of information on facilities, establishment of facility operation process, facility budget management, etc.), building management company management (company state management, contract information management, company evaluation management, etc.), and the like.

The FMS may enable effective information-based management of building facilities and information-based standardized facility management work operation, so as to reduce building operation costs and perform effective maintenance for facilities, thereby preventing unexpected facility failures and shortening repair time, increasing building management efficiency by effective operation of resources for building facility management, and improving and establishing a building management operation system.

Hereinafter, with reference to the accompanying drawings, the present disclosure provides a preferred embodiment of an intelligent automatic building control system in which a BAS and an FMS are integrated, and a facility management method by the intelligent automatic building control system. For reference, terms referring to respective elements of the present disclosure are exemplarily named in consideration of functions thereof, and thus the technical contents of the present disclosure should not be predicted and limited by the terms themselves.

FIG. 1 is a block diagram schematically illustrating a configuration of an intelligent automatic building control system in which a BAS and an FMS are integrated, according to an embodiment of the present disclosure.

Referring to the drawing, an intelligent automatic building control system, in which a BAS and an FMS are integrated, according to an embodiment of the present disclosure may include a remote control device, in which a BAS unit and an FMS unit are integrated, and may further include a storage unit and a communication unit. The intelligent automatic building control system may further include a central control device.

The intelligent automatic building control system in which the BAS unit and the FAS unit are integrated may include a dual-structured processor, wherein one part of the processor may be designed to perform a processor function of the BAS and the other part of the processor may be designed to perform a processor function of the FMS.

The automatic building control system includes: a plurality of wired/wireless environment information devices or IoT environment information devices for measuring and monitoring environment state information of each location within a building or performing measurement/meter-reading of various information from respective facilities; a remote control device that receives and processes each piece of information; and a display means (not illustrated) capable of displaying each piece of information The wired/wireless environment information devices or IOT environment information devices may include a temperature measurement device, a humidity measurement device, a pressure measurement device, a fine dust measurement device, and the like.

The dual-structured processor may be included in the remote control device, wherein the dual-structured processor may include a BAS processor and an FMS processor, by which not only respective functions of the BAS unit and the FMS unit may be individually processed, but also the respective functions may be integrated and processed. In particular, the present specification provides descriptions with an example wherein the processor of the FMS unit may not only perform a basic FMS function, but also perform an additional function capable of processing information from the BAS unit by sharing/exchanging the information. An element for performing such a function is illustrated as an additional function unit within the FMS processor.

The remote control device may collect and store/calculate/output operation, monitoring, and information histories of air conditioners, refrigerators, fans, boilers, lighting, power facilities, etc., which are facilities to be controlled, and may share information with a central control device or another automatic control device. The remote control device may perform operation control, history management, and efficiency analysis for a facility to be controlled, and on the basis thereof, the remote control device may predict fluctuations in operation costs and determine a failure sign.

The BAS unit may compare and analyze received environment information and information on operation conditions, and may output a control signal for operating each facility to be controlled. For example, the BAS unit may output an operation signal for a boiler, may monitor an operation state of the boiler, and may output an operation signal according to a schedule.

The FMS unit may receive history information and information on energy consumption and energy production for the facility to be controlled, may transmit the received information to an integrated controller, and may also analyze efficiency of each facility.

In particular, the remote control device, preferably, the processor of the FMS unit may compare and analyze information provided by the BAS unit and the FMS unit, may transmit a result value to the central control device or another automatic control device and share the information therewith, and may further select and operate a device to be controlled via a high-efficiency facility selection operation control algorithm. If a facility, which is in a lower efficiency state compared to an expected efficiency value, is detected, a failure/abnormality sign may be determined for a corresponding facility, and a result of the determination may be used for replacement/repair/maintenance of the facility.

The storage means includes a database capable of storing and managing information input via the BAS unit and the FMS unit, information calculated therefrom, and information transmitted to the outside. As a result, due to the storage means, efficiency analysis information of the facility to be controlled and information available for facility management may be utilized for additional control or analysis.

The communication unit provides a transmission/reception function to share a variety of information with the central control device or with a plurality of remote control panels.

The central control device organizes and stores information input in relation to operation conditions of various facilities provided from the remote control device, and result information analyzed by the integrated controller, and the organized and stored information is expressed to an operator in an audiovisual scheme, such as figures, animation objects, trends, and sounds.

In the drawing, an input/output unit of the BAS unit is an element that collects in-building environment information collected from an environment information device, an air conditioner, a refrigerator, a boiler, etc., and operation state information of a device to be controlled in the building, and transmits a command to the device to be controlled.

In particular, the input/output unit of the BAS unit may wirelessly communicate with an IoT environment information device including an IoT wireless sensor, an IoT wireless input/output unit, and an IoT wireless meter, by using a communication scheme that implements IoT communication, such as Z-wave, ZigBee, and BLE. As described above, since environment information and energy information may be collected wirelessly, there is no need to install a wired line, and selection and change of installation locations of a communication device and each measurement device are not affected.

Again, functions of respective units are summarized as follows.

BAS function logic is a program that stores, loads, and executes a function logic defined, in advance, for a control of the device to be controlled by the BAS processor. With the aid of the BAS function logic, the BAS processor may manage the input/output unit and a shared storage unit (including an I/O data storage unit, a real-time energy data storage unit, a machine learning data storage unit, and a facility management data storage unit) via RTOS, may control execution of the BAS function logic by using information stored in the shard storage unit in order to control the device to be controlled, and may perform a function to exchange information with the remote management server of the central control device via the communication unit.

The input/output (I/O) data storage unit, the real-time energy data storage unit, the machine learning data storage unit, and the facility management data storage unit are collectively referred to as a storage unit or a shared storage unit. The I/O data storage unit is a space for storage and modification of an input/output signal of a field in real time via the input/output unit and the BAS processor.

The real-time energy data storage unit is a space for storing and logging an amount of energy use and sensor information in real time.

The machine learning data storage unit is a space for combining and storing input/output data, real-time energy data, and facility management data, which are to be used by a facility operation machine learning unit, and for storage and modification of information generated via the machine learning unit.

The facility management data storage unit is a space for reception of facility management data, which is managed by the FMS, via an interface of the manager, and storage of modified data.

The facility operation machine learning unit processes a machine learning function to predict replacement information and alternatively control facilities, on the basis of I/O data, real-time energy data, facility management data, and information logged in the machine learning data storage unit.

An energy use metering unit is an interface circuit for receiving an amount of energy consumed by various facilities in a building.

The FMS processor may identify, via RTOS, a sensor signal and an amount of energy use, may retrieve real-time data and facility management data to input the same to the facility operation machine learning unit in order to manage information for the FMS, and may perform a function to exchange, via the communication unit, a result of machine learning execution.

An FMS information management unit provides an interface that enables the facility manager to search, input, and modify a variety of information for the FMS.

The communication unit is an external interface implemented to enable the BAS processor and the FMS processor to communicate seamlessly with an external device, and may configure a socket communication server using TCP/IP. The communication unit may support various wireless and/or wired communication schemes, for communication with other devices/servers.

The central control device may provide the manager with a real-time viewer for checking and controlling FMS management information/field sensor information/BAS facility information/energy information, etc. in real time, and may provide the manager interface for managing facility and field data and log-in information.

Figure 2:
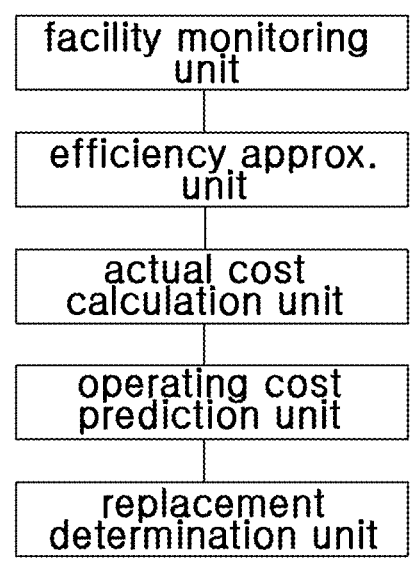
FIG. 2 illustrates a configuration of an additional functional unit.

The intelligent automatic building control system of the present disclosure, in which the FMS unit and the BAS unit are integrated, may predict efficiency of a specific facility so as to determine an optimal replacement time to minimize operation costs, wherein such a function is performed by the additional function unit. FIG. 2 schematically illustrates a configuration of the additional function unit. The additional functional unit may include a facility monitoring unit, an efficiency approximation unit, an actual cost calculation unit, an operation cost prediction unit, and a replacement determination unit. The additional functional unit or the elements will be illustrated and described to be implemented by the processor of the FMS unit, but the FMS unit and the BAS unit may be processed by separate elements (e.g., any function unit in the central control device).

The facility monitoring unit measures fuel consumption of a specific facility during a predetermined period (e.g., one hour) while the facility (e.g., a boiler) is operating. The facility monitoring unit receives an amount of cooling/heating supply (e.g., an amount of temperature change of hot water discharged from the boiler) of the facility, which is measured by the BAS unit.

The efficiency approximation unit calculates an energy efficiency value of the facility, based on the amount of cooling/heating supply and the fuel consumption (or power consumption) supplied to the facility for each of multiple consecutive periods. Subsequently, based on the calculated energy efficiency values, an efficiency approximation equation reflecting a change trend of the energy efficiency value is generated. A method of generating the efficiency approximation equation will be described later.

The actual cost calculation unit acquires the amount of fuel consumption measured in each of multiple periods and a real-time price of fuel (or power) at a corresponding time point, and based on this information, the actual cost calculation unit calculates an actual fuel consumption cost that is a cost (or power use fee) of fuel actually consumed by the facility.

The operation cost prediction unit acquires an initial purchase cost of the facility, calculates an actual fuel consumption (or actual power consumption) cost calculated by the actual cost calculation unit, and an energy efficiency prediction value at a specific time according to the efficiency approximation equation, and generates an equation for calculating a purchase/operation cost of the facility. A method of generating the equation will be described later.

The replacement determination unit calculates the purchase/operation cost of the facility at a specific time point in the future by using the equation for calculating the purchase/operation cost. Subsequently, a point in time, at which a predetermined configured value (i.e., a limit value of the operating cost allowed by the facility) intersects in the direction of increasing the calculated purchase/operation cost, is determined to be an optimal replacement time for the facility.

The predicted optimal replacement time may be displayed via a display means or may be notified to an operator of the FMS unit.

Further, energy efficiency predicted by the efficiency approximation equation and the elements may be used to establish a budget required for managing the facilities or building. That is, information, which indicates a trend of future efficiency fluctuation predicted based on efficiency actually measured from the past to the present, may be provided to a manager, a program, or a server, which establishes a budget of cost for facility or building management. Accordingly, it is possible to predict a future energy consumption cost, a failure occurrence/repair cost, and a replacement cost of a corresponding facility, thereby enabling reasonable budget design based on actually measured values.

Hereinafter, according to an embodiment of the present disclosure, descriptions will be provided for a facility management method by the intelligent automatic building control system, in which the BAS and the FMS are integrated, for controlling a boiler as a facility to be controlled.

Figure 3:
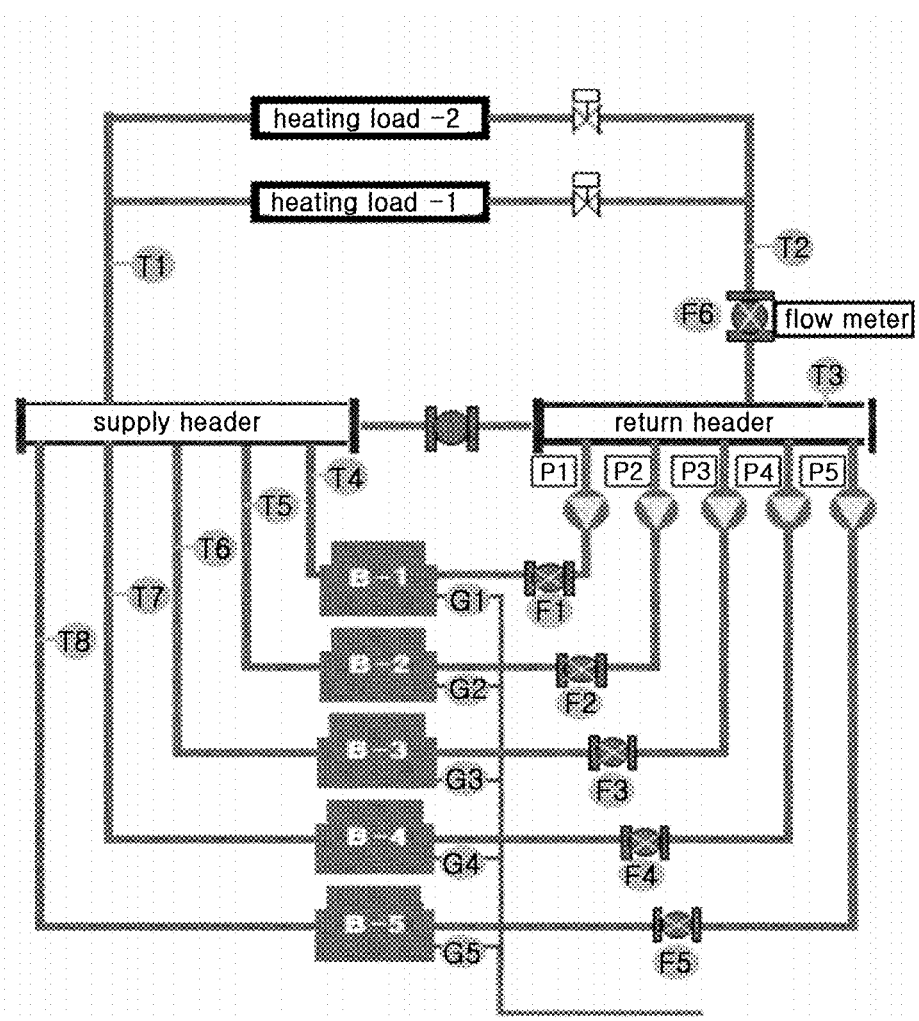
FIG. 3 illustrates a method in which a plurality of boilers are arranged in parallel in a building, wherein, in this arrangement, an operation scheme according to an embodiment of the present disclosure, in which the plurality of boilers are selected from high-efficiency facilities so as to be operated, may be applied.

FIG. 3 is a diagram schematically illustrating a parallel arrangement scheme of boilers, to which an operation scheme according to an embodiment of the present disclosure is applicable, in which a plurality of boilers are selected from high-efficiency facilities in a building so as to be operated.

Referring to the drawing, in order to supply hot water with an appropriate temperature and flow rate to a heating load, one to five specific boilers may operate.

A supply header and a return header are parts that branch and gather hot water pipes.

An individual hot water temperature sensor is disposed between the supply header and the return header of each boiler (B-1 to B-5) so as to measure a temperature of hot water discharged from the boiler. The temperature sensor is disposed between the supply header and the heating load so as to measure a temperature (temperature of hot water supplied to the heating load) of hot water mixed by the supply header. The temperature of hot water (low-temperature hot water after passing through the heating load) to be supplied to the boiler is measured at the front end of the return header or at the return header. Each boiler is equipped with a flow meter so that a flow rate at passing through the boiler may be measured.

In addition, a flow meter for measuring a flow rate of supplied fuel may be installed in each boiler.

Hereinafter, the configuration of the present disclosure will be described via operation of the facilities.

An equation for calculating energy efficiency of an operating boiler is defined as follows.

$$\text{Boiler operation energy effciency (\%)} = \frac{m*c_p*\Delta T}{10^3*Hh*G_f}*100 \quad \text{(Equation 1)}$$

Where,
m=flow rate to boiler (kg/h),
$c_p$=specific heat of water 4.186 (kJ/(kg*K)),
$\Delta T$=heating supply temperature—heating return temperature (° C.) (cooling return temperature—cooling supply temperature),
Hh=calorific value of gas used (MJ/m$^3$), and
Gf=gas consumption (m$^3$/h)

For each operation day of the boiler, each of a daily operation time and a daily cumulative operation time may be determined, a flow rate of hot water (low-temperature hot water) supplied to the boiler may be collected via a remote reading flow meter connected to the FMS unit, $\Delta T$ may be collected via a wired/wireless environment information sensor connected to the BAS unit, and gas consumption may be collected via a remote reading gas meter connected to the FMS unit.

Based on Equation 1, operation energy efficiency of a specific boiler may be calculated.

Equation 1 may also be applied to a refrigerator as well as a boiler. For example, an equation for calculating operation efficiency of a refrigerator may be defined as follows.

$$\text{Turbo refrigerator operation energy efficiency (\%)} = \frac{m*C_p*\Delta T}{\text{amount of power use}}*100 \quad \text{(Equation 2)}$$

Operation energy efficiency of an absorption cold/hot water dispenser may also be defined with reference to Equation 1.

$$\text{Absorption cold/hot water dispenser operation energy effciency (\%)} = \frac{m*c_p*\Delta T}{10^3*Hh*G_f}*100 \quad \text{(Equation 3)}$$

Further, air-cooled cooling tower operation energy efficiency may also be defined with reference to Equation 1.

$$\text{Cooling tower operation energy efficiency (\%)} = \frac{m*C_p*(\text{cooling towerinlet temperature} - \text{cooling tower outlet temperature})}{\text{amount of power use for cooling pan}}*100 \quad \text{(Equation 4)}$$

In this way, by integrating the BAS unit and the FMS unit, basic data collected by the BAS unit and the FMS unit may be substituted for the operation energy efficiency equations for a boiler, an absorption cold/hot water dispenser, a refrigerator, a cooling tower, etc., so that operation energy efficiency corresponding to each facility may be calculated.

Here, a boiler may use fuel, such as gas or kerosene, or may operate using electric power. Similarly, various facilities, to which the present disclosure may be applied, such as a refrigerator and a cooling tower, may also operate using electric power as well as fuel such as gas or kerosene. Accordingly, in the present disclosure, terms, such as fuel, fuel cost, and fuel consumption, refer to terms including electric power, electricity use fee, power consumption, etc., and the above two terms should be thus understood to have the same meaning.

In order to calculate operation energy efficiency of a boiler by means of the equation, efficiency information is calculated by operating the boiler under standard conditions for predetermined duration of a predetermined period or at the beginning of each month.

After calculating the efficiency information, the required number of boilers may be operated from high-efficiency boilers for respective boilers. Therefore, it is possible to save energy via high-efficiency operation.

[Table 1] shows an example of selecting a boiler in order of efficiency for the following operation conditions. Efficiency of boilers is assumed to be boiler 1>boiler 2>boiler 3>boiler 4>boiler 5.

Operation conditions for one boiler=when a boiler specified by a user operates,

Operation conditions for two boilers=minimum load amount configuration value for two boilers<load capacity for two boilers, Operation conditions for three boilers=minimum load amount configuration value for three boilers<load capacity for three boilers, Operation conditions for four boilers=minimum load amount configuration value for four boilers<load capacity for four boilers, and Operation conditions for five boilers=minimum load amount configuration value for five boilers<load capacity for five boilers.

TABLE 1

|  | High-efficiency boiler 1 | High-efficiency boiler 2 | High-efficiency boiler 3 | High-efficiency boiler 4 | High-efficiency boiler 5 |
| --- | --- | --- | --- | --- | --- |
| Operation conditions for one boiler | Operating | | | | |
| Operation conditions for two boilers | Operating | Operating | | | |
| Operation conditions for three boilers | Operating | Operating | Operating | | |
| Operation conditions for four boilers | Operating | Operating | Operating | Operating | |
| Operation conditions for five boilers | Operating | Operating | Operating | Operating | Operating |

According to the present disclosure, future efficiency of a boiler may also be predicted.

An operation time, a cumulative operation time, and an operation energy efficiency value calculated for the operation time, on the basis of boiler operation days are organized as shown in [Table 2] and stored in the storage unit

| Operation days | 1 | 2 | 3 | 4 | ... | 151 | 152 | 153 | 154 | ... |
| --- | --- | --- | --- | --- | --- | --- | --- | --- | --- | --- |
| Operation time per day | 7 | 7 | 7 | 7 | | 7 | 7 | 7 | 0 | |
| $x_i$ (unit: cumulative operation time h) | 7 | 14 | 21 | 28 | ... | 672 | 679 | 686 | 686 | ... |
| $y_i$ (unit: operation efficiency per operation time %) | 89.9% | 89.9% | 89.9% | 89.9% | ... | 88.9% | 88.9% | 88.9% | 88.9% | ... |

| Operation days | 251 | 252 | 253 | 254 | ... | 365 | 366 | 367 |
| --- | --- | --- | --- | --- | --- | --- | --- | --- |
| Operation time per day | 0 | 7 | 7 | 7 | | 7 | 7 | |
| $x_i$ (unit: cumulative operation time h) | 1267 | 1274 | 1281 | 1288 | ... | 1841 | 1841 | |
| $y_i$ (unit: operation efficiency per operation time %) | 87.9% | 87.9% | 87.9% | 87.9% | ... | 87.3% | 87.3% | Current time assumed |

$x_i$ (unit: cumulative operation time (h) up to an i-th day after operation)

$y_i$ (unit: operation energy efficiency (%) at the time of operation up to the i-th day after operation)

Information in [Table 2] is used to predict future efficiency by machine-learning efficiency of a corresponding boiler.

Here, $x_i$ is a cumulative operation time up to the i-th day after operation (unit: h), and $y_i$ is operation energy efficiency (unit: %) at the time of operation up to the i-th day after operation Energy efficiency during facility operation of a later time may be predicted via the following algorithm That is, random boiler 1 is to exhibit a characteristic that operation energy efficiency based on the operation time decreases due to deterioration etc. as the operation time increase, and a change in efficiency values may thus be approximated by the following equation.

$$y_i = Wx_i + b = H(x_i) \quad \text{(Equation 5)}$$

A relationship of Equation 5 may be configured to be a hypothesis, and when this relationship is expressed as a graph, the graph may be expressed as a straight line, and the shape of the straight line is different for each boiler according to W and b.

In the present disclosure, Equation 5 has been determined using a linear regression algorithm among machine learning methods.

If the FMS unit applies a gradient descent algorithm to measured/calculated values of up to an (i−1)th day, which are stored in the storage means, W and b values in Equation 5 may be determined. In the present specification, W=−0.0000155 and b=0.90132 are determined as an example. When substituting this result for an initially configured approximation equation (Equation 5), y=−0.0000155*x+0.90132.

That is, a change in energy efficiency of a corresponding facility over time for a later time may be predicted using a cumulative operation time up to the (i−1)th day and information on operation energy efficiency per hour up to the cumulative operation time.

As described above, being able to predict operation efficiency that the facility is to show on a specific date at a later time may provide much useful information to the facility manager.

For example, when energy efficiency is predictable, if operation energy efficiency of the i-th day, which is predicted via a machine learning method based on measured, calculated, and accumulated values up to the (i−1)th day, is different from operation energy efficiency of the i-th day, which is measured on the i-th day, by a predetermined range or more (that is, if the measured operation energy efficiency is lower than the predicted operation energy efficiency by the predetermined range or more), a state of the facility may be considered abnormal. That is, whether the facility is malfunctioning or operating under abnormal conditions may be notified to the facility manager via a mobile phone text message so as to cause the facility manager to directly check the same, or may be displayed on the display means of the automatic control system.

The approximation equation representing a trend of decrement of energy efficiency may be supplemented as follows.

$$y_i = Wx_i + b - \delta \quad \text{(Equation 6)}$$

Figure 4:
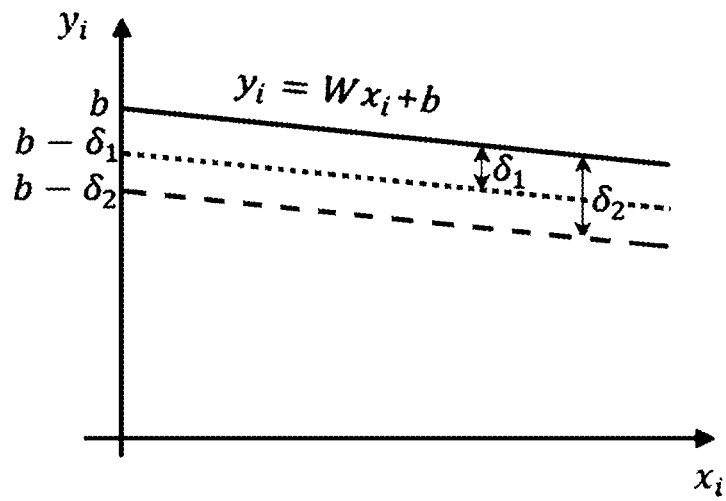
FIG. 4 is a graph showing a predicted energy efficiency approximation equation, a measured energy efficiency approximation equation, and an allowable range of efficiency fluctuations.

Equation 6 may be expressed in a relationship as in FIG. 4, when W<0. FIG. 4 is a graph showing a predicted energy efficiency approximation equation, a measured energy efficiency approximation equation, and an allowable range of efficiency fluctuations. Here, δ represents a difference between predicted energy efficiency and measured energy efficiency. An efficiency approximation equation descending to the right shows reduction in efficiency of a corresponding facility, which is close to a measured value. If a difference between an efficiency value predicted by the efficiency approximation equation and an energy efficiency value measured at a corresponding time point has a value equal to or larger than a predetermined range, a boiler may be considered to operate in an abnormal state.

For example, if the difference has a value within the preconfigured range ($\delta_1$), this is still an acceptable difference, but the difference may be regarded as a case in which a state of the facility needs to be checked in a short time. In this case, the integrated controller may output an appropriate alert to the BAS or facility manager.

On the other hand, if the difference exceeds the range ($\delta_1$) and falls within a preconfigured range ($\delta_2$), it may be determined that the facility is operating in an abnormal state outside an allowable range of efficiency fluctuation. In this case, an alert with a higher intensity compared to the above case may be output.

If it is determined that the difference exceeds the range ($\delta_2$), it may be considered that the facility is operating in a seriously abnormal state, and the integrated controller may immediately output an alert of a highest level.

By using an energy efficiency prediction value calculated in the present disclosure, gas consumption of a corresponding facility for a later time may be predicted, and the energy efficiency prediction value may be associated with an accounting program that manages a corresponding building, so as to be used as basic data for establishing energy cost budget of the facility for a later time.

From an economical point of view, the present disclosure may predict an optimal replacement time of a specific boiler. By summing a value, which obtained by dividing an initial purchase cost of the boiler by a cumulative operation time, and a value, which is obtained by dividing a cumulative operation cost/energy cost by the cumulative operation time, a boiler purchase cost and an operation/energy cost (i.e., total cost) for each operation time may be calculated. From the economic point of view for the facility, a point in time when a total cost becomes minimum may be referred to as an optimal replacement time. Alternatively, an optimal replacement time may be determined to be a point in time at which a calculated cost intersects a random value in an ascending (increasing) direction, wherein the random value is configured as the total cost. This relationship may be understood with reference to FIG. 5.

Figure 5:
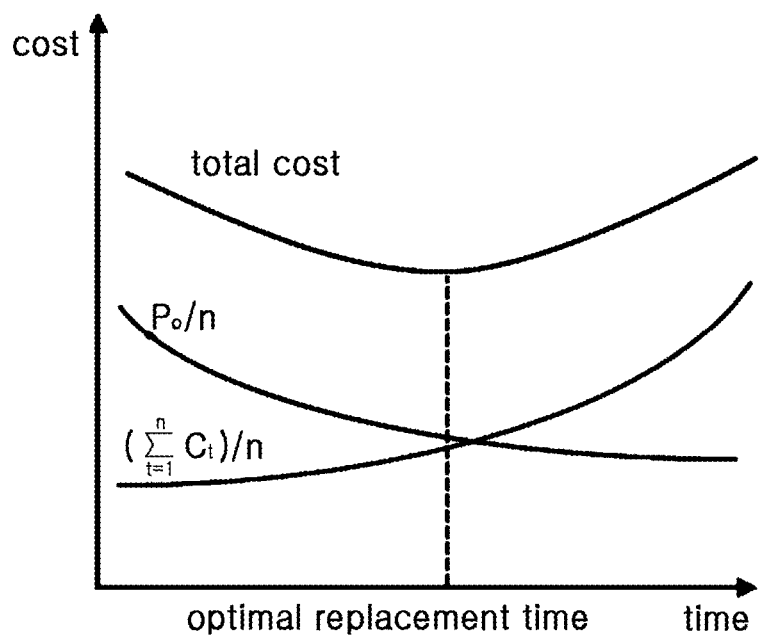
FIG. 5 illustrates a graph enabling determination of an optimal replacement time for a boiler, which is expressed by an equation of the present disclosure.

FIG. 5 illustrates a graph enabling determination of an optimal replacement time for a boiler, which is expressed by an equation of the present disclosure. A boiler purchase cost and an operation/energy cost are made in a form of descending and then ascending, and in reality, a lowest point becomes an optimal replacement time. However, due to actual operation conditions, it may be desirable to configure a random cost that is higher than the lowest point, and determine an optimal replacement time to be a point in time at which the boiler cost passes the configured value in a section of descending and then ascending.

Purchase cost and operation/energy cost $\quad$ (Equation 7)

$$(PEC; \text{purchase energy cost})(n) = \left(P_0 + \sum_{t=1}^{n} C_t\right) / n$$

Here, n is a boiler use time (cumulative operation time), PEC(n) is a boiler purchase cost and an operation/energy cost (i.e., total cost) in n hours, P is an initial boiler purchase cost, and C is an operation cost/energy cost at time t (hours).

The main concept of Equation 7 is based on that a value obtained by dividing the initial purchase cost by time decreases as a use period increases, but a value obtained by dividing the operation/energy cost by time gradually increases due to deterioration of the boiler as the use period increases. From an economic point of view, the optimal replacement time for the boiler is determined to be a point in time at which a total cost that is the sum of the initial purchase cost and the operation/energy cost becomes minimum.

For example, if the facility manager uses the present disclosure, the facility manager may be able to predict the optimal replacement time from the economic point of view, by using pre-stored boiler operation information of about 3 years. An example is as follows.

It is assumed that the boiler operates for 4 months (122 days) a year, wherein the boiler operates for 5 days per week and operates an average of 7 hours per day. It is assumed that $\Delta T$ is configured to 20 degrees, a supply flow rate to the boiler (m)=100 m$^3$/h=100*1000 kg/h, a gas calorific value (Hh)=39.97 MJ/m$^3$, a specific heat capacity of water=4.186 kJ/(kg·K), an initial purchase amount of the boiler is 80 million KRW (Korean won), and a gas purchase price is 684.59749 KRW/Nm$^3$ (as of Jan. 1, 2020, the unit price of winter gas for cooling/heating and air conditioning of Seoul City Gas is 16.0953 KRW/MJ, and the average calorific value of Seoul City Gas in January 2020 is 42.534 MJ/m$^3$).

In this case, when using Equation 5, $y_i = -0.0000155*x + 0.90132$.

Therefore, according to Equation 1, gas consumption $Gf_i$ per hour at the time point of an i-th day at a later time is $$\frac{m * c_p * \Delta T}{10^3 * Hh * y_i} * 100.$$

As in Equation 7, $$PEC(n) = \left(P_0 + \sum_{t=1}^{n} C_t\right) / n$$

PEC(n) from an initial operation time to a current cumulative operation time is based on actually measured data, and PEC(n) may be calculated after the current cumulative operating time, by using the following equation $$PEC(n) = \left[ P_0 + \sum_{t=1}^{\substack{current \\ cumulative \\ operation\ time}} \text{measured data} + \right.$$

$$\left. \sum_{\substack{t=current \\ cumulative \\ operation\ time}}^{n} \left(\frac{m * C_p * \Delta T}{10^3 * Hh * y_i} * 100 * 7 * 684.59749\right) \right] / n + \quad (8)$$

$$\left. \sum_{\substack{t=current \\ cumulative \\ operation\ time}}^{n} \left(\frac{m * C_p * \Delta T}{10^3 * Hh * y_i} * 100 * 7 * 684.59749\right) \right] / n$$

In Equation 8, $y_i$ may use a value derived from Equation 5. Therefore, from the economic point of view, the optimal replacement time may refer to a cumulative operation time at which a PEC(n) value calculated by Equation 8 becomes minimum.

When PEC(n) is calculated by referring to the above exemplified approximation equation values, PEC(n) is 180,927.7532 when cumulative operation time n is 7007 hours (an 1387th day), 180,927.7405 when cumulative operation time n is 7014 hours (an 1388th day), and 180,927.7525 when cumulative operation time n is 7021 hours (an 1389th day), so that PEC(n) is minimum when the cumulative operation time is 7014 hours (the 1388th day), and it can be thus seen that this is the optimal replacement time. Assuming that a driving time per year is 4 months (122 days) and an average driving time per day is 7 hours, the 1388th day corresponds to an 11 years and 46th day.

As can be seen from the examples, a longer operation time may obtain more measured information, and a more accurate prediction value may be obtained using the obtained information. In particular, when there is little time left to the optimal replacement time, the cumulative measured information may be more than prediction information of the remaining period, so that a more accurate prediction time may be found.

Accordingly, the present disclosure implements an intelligent automatic building control system by applying a dual-structure processor, wherein a part of the processor functions as a processor of a BAS, and the other part of the processor functions as a processor of an FMS, so that three effects may be achieved by installing the integrated system of the present disclosure. A BAS unit and an FMS unit are configured into a single product, and information may thus be shared seamlessly. Accordingly, it is advantageous to obtain and provide useful information, such as calculation of current operation energy efficiency, high-efficiency equipment selection operation, prediction of operation energy efficiency for a later time, failure sign detection, text message transmission to a facility manager, prediction of energy consumption to establish future energy budget, and prediction of an optimal facility replacement time.

The embodiments of the present disclosure described above are merely illustrative of the technical idea of the present disclosure, and the scope of protection of the present disclosure should be interpreted according to the following claims. Those skilled in the art, to which the present disclosure belongs, will be able to make various modifications and variations without departing from essential characteristics of the present disclosure, and all technical ideas within the scope of the present disclosure and equivalent should be thus interpreted as being included in the scope of the present disclosure.

What is claimed is:

1. An intelligent automatic building control system in which a building automation system (BAS) and a facility management system (FMS) are integrated, the system comprising:
a BAS unit configured to monitor an environmental condition at a predetermined location in a building, and control and monitor operation of a specific facility that supplies cooling/heating to the location in order to improve the environmental condition; and
an FMS unit configured to maintain information input in relation to the facility, check a fuel consumption of the facility, and monitor a real-time price of fuel supplied to the facility;
wherein the FMS unit further comprises:
a facility monitoring unit configured to measure a fuel consumption of the facility and receive an amount of cooling/heating supply of the facility from the BAS unit, during a preconfigured period while the facility is operating;
an efficiency approximation unit configured to, in each of the consecutive multiple periods, calculate an energy efficiency value of the facility on the basis of the fuel consumption and the amount of cooling/heating supply, and generate an efficiency approximation equation that reflects, based on the calculated energy efficiency values, a change in the energy efficiency values;
an actual cost calculation unit configured to, in each of the multiple periods, calculate an actual fuel consumption cost of the facility on the basis of the fuel consumption and the real-time price;
an operation cost prediction unit configured to generate an equation for calculating a purchase/operation cost of the facility on the basis of an initial purchase cost of the facility, an actual fuel consumption cost, and an energy efficiency prediction value calculated by the efficiency approximation equation; and
a replacement determination unit configured to calculate the purchase/operation cost at a specific point in a later time by means of the equation, and determine an optimal replacement time of the facility to be a point in time at which a predetermined configuration value intersects in an ascending direction of the calculated purchase/operation cost;
wherein the efficiency approximation equation of the efficiency approximation unit is defined to be a linear equation of $y_i = Wx_i + b$,
where: W and b are constants determined by the efficiency approximation unit on the basis of the calculated energy efficiency values;
$y_i$ is energy efficiency at a point in time at which the facility has operated up to an i-th day; and
$x_i$ is a cumulative operation time (unit: hour) of the facility up to the i-th day.

2. The system of claim 1, wherein the equation of the operation cost prediction unit is defined to be $$ASC(n) = \left[ P_0 + \sum_{t=1}^{\substack{current \\ cumulative \\ operation\ time}} (\text{actual energy consumption cost}) + \right.$$

$$\left. \sum_{t=current}^{n} \left( \frac{m \times C_p \times \Delta T}{10^3 \times Hh \times y_i} \times 100 \times \right.\right.$$
$$\left.\left. \substack{cumulative \\ operation\ time} \right.\right.$$

$$\left.\left. (\text{operation hour per day}) \times (\text{gas purchase unit price}) \right) \right] / n,$$

where: n is a cumulative operation time (unit: hour) of the facility;
PEC(n) is a purchase/operation cost of the facility at a time point of n hours;
$P_0$ is an initial purchase cost (unit: KRW) of the facility;
m is a flow rate (unit: m³) of fluid flowing into the facility;
$c_p$ is a specific heat (unit: kJ/(kg·° C.) of the fluid;
ΔT is an amount (unit: ° C.) of temperature change of the fluid due to operation of the facility;
Hh is a calorific value (unit: MJ/m³) of the fuel supplied to the facility;
$y_i$ is energy efficiency (unit: %) at the point in time at which the facility has operated up to the i-th day;
denominator 1000 is to match a unit of the specific heat of the numerator and a unit of the calorific value of the denominator; and
numerator 100 is to change the energy efficiency ($y_i$) expressed as a percentage to an original numerical value.

3. The system of claim 1, further comprising a plurality of the facilities, wherein the FMS unit:
generates and maintains the efficiency approximation equation for each of the facilities;
when the BAS unit determines the number of facilities required to operate to improve the environmental condition of the predetermined location, selects, based on an efficiency prediction value calculated for a corresponding date of each facility, the determined number of facilities sequentially from a facility having a high efficiency prediction value and
informs the BAS unit of the selected facilities so as to operate the same.

4. The system of claim 2, further comprising a plurality of the facilities, wherein the FMS unit:
generates and maintains the efficiency approximation equation for each of the facilities;
when the BAS unit determines the number of facilities required to operate to improve the environmental condition of the predetermined location, selects, based on an efficiency prediction value calculated for a corresponding date of each facility, the determined number of facilities sequentially from a facility having a high efficiency prediction value and
informs the BAS unit of the selected facilities so as to operate the same.

5. The system of claim 1, wherein the FMS unit:
calculates a difference between the value of b in the efficiency approximation equation and a value of b that is generated by actual measurement; and
when the difference is out of a predetermined range, determines that the facility is in an abnormal state.

6. A facility management method performed by an intelligent automatic building control system in which a building automation system (BAS) and a facility management system (FMS) are integrated, the system comprising:
- a BAS unit configured to monitor an environmental condition at a predetermined location in a building, and control and monitor an operation of a specific facility that supplies cooling/heating to the location in order to improve the environmental condition; and
- an FMS unit configured to maintain information input in relation to the facility, check a fuel consumption of the facility, and monitor a real-time price of fuel supplied to the facility;

wherein the method comprises:
- a facility monitoring operation of measuring a fuel consumption of the facility and measuring an amount of cooling/heating supply of the facility from the BAS unit, during a preconfigured period while the facility is operating;
- an efficiency approximation operation of, in each of the consecutive multiple periods, calculating an energy efficiency value of the facility on the basis of the fuel consumption and the amount of cooling/heating supply, and generating an efficiency approximation equation that reflects, based on the calculated energy efficiency values, a change in the energy efficiency values;
- an actual cost calculation operation of, in each of the multiple periods, calculating an actual fuel consumption cost of the facility on the basis of the fuel consumption and the real-time price;
- an operation cost prediction operation of generating an equation for calculating a purchase/operation cost of the facility on the basis of an actual fuel consumption cost, an initial purchase cost of the facility, and an energy efficiency prediction value calculated by the efficiency approximation equation; and
- a replacement determination operation of calculating the purchase/operation cost at a specific point in a later time by means of the equation, and determining an optimal replacement time of the facility to be a point in time at which a predetermined configuration value intersects in an ascending direction of the calculated purchase/operation cost;

wherein the efficiency approximation equation of the efficiency approximation unit is defined to be a linear equation of $y_i = Wx_i + b$, where: W and b are constants determined by the efficiency approximation unit on the basis of the calculated energy efficiency values;

$y_i$ is energy efficiency at a point in time at which the facility has operated up to an i-th day; and $x_i$ is a cumulative operation time (unit: hour) of the facility up to the i-th day.

7. The method of claim 6, wherein the equation of the operation cost prediction operation is defined to be $$ASC(n) = \left[ P_0 + \sum_{t=1}^{\substack{current \\ cumulative \\ operation\ time}} (\text{actual energy consumption cost}) + \right.$$

$$\left. \sum_{\substack{t=current \\ cumulative \\ operation\ time}}^{n} \left( \frac{m \times C_p \times \Delta T}{10^3 \times Hh \times y_i} \times 100 \times (\text{operation hour per day}) \times (\text{gas purchase unit price}) \right) \right] / n,$$

where: n is a cumulative operation time (unit: hour) of the facility;

PEC(n) is a purchase/operation cost of the facility at a time point of n hours;

$P_0$ is an initial purchase cost (unit: KRW) of the facility;

m is a flow rate (unit: $m^3$) of fluid flowing into the facility;

$c_p$ is a specific heat (unit: kJ/(kg·° C.) of the fluid;

$\Delta T$ is an amount (unit: ° C.) of temperature change of the fluid due to operation of the facility;

Hh is a calorific value (unit: $MJ/m^3$) of the fuel supplied to the facility;

$y_i$ is energy efficiency on the i-th day;

denominator 1000 is to match a unit of the specific heat of the numerator and a unit of the calorific value of the denominator; and numerator 100 is to change the energy efficiency (y) expressed as a percentage to an original numerical value.

8. The method of claim 6, wherein the intelligent automatic building control system, in which the BAS and the FMS are integrated, is configured to individually control a plurality of facilities, and the automatic building control system:
- generates and maintains the efficiency approximation equation for each of the facilities;
- when the number of facilities required to operate to improve the environmental condition of the predetermined location is determined, selects, based on an efficiency prediction value calculated for a corresponding date of each facility, the determined number of facilities sequentially from a facility having a high efficiency prediction value; and
- operates the selected facilities.

9. The method of claim 6, further comprising:
- acquiring the value of b in the efficiency approximation equation;
- acquiring a value of b that is generated by actual measurement;
- calculating a difference between the value of b in the efficiency approximation equation and the value of b acquired by actual measurement; and
- when the difference is out of a predetermined range, determining that the facility is in an abnormal state.

* * * * *